United States Patent [19]

Kamei et al.

[11] 4,069,057

[45] Jan. 17, 1978

[54] MONOLITHIC REFRACTORY MATERIALS

[75] Inventors: Siro Kamei, Mitaka; Kenzo Takeda, Toyonaka; Mitsunao Takahashi, Hirakata; Jiro Nakano, Settsu, all of Japan

[73] Assignees: Nippon Crucible Co., Ltd., Tokyo; Teikoku Kako Co., Ltd., Osaka; Nippon Steel Corporation, Tokyo, all of Japan

[21] Appl. No.: 658,781

[22] Filed: Feb. 17, 1976

[30] Foreign Application Priority Data

Feb. 15, 1975    Japan .................................. 50-19327

[51] Int. Cl.$^2$ ...................... C04B 35/14; C04B 35/52; C04B 35/58; C04B 35/66
[52] U.S. Cl. ........................................ 106/55; 106/43; 106/44; 106/56; 106/57; 106/58; 106/59; 106/60; 106/62; 106/63; 106/65; 106/66; 106/69; 106/73.4; 106/73.5
[58] Field of Search ................... 106/44, 65, 69, 73.4, 106/73.5, 56, 38.27, 38.28, 38.9, 84, 43, 57, 58, 59, 60, 62, 63, 66

[56] References Cited

U.S. PATENT DOCUMENTS

| 3,445,257 | 5/1969  | Hloch et al. ........................ 106/84   |
| 3,547,670 | 12/1970 | Fuchs et al. ..................... 106/65 X   |
| 3,634,286 | 1/1972  | Yates ............................... 106/69 X |
| 3,650,783 | 3/1972  | Yates ............................... 106/69   |
| 3,708,317 | 1/1973  | Owen et al. ..................... 106/56 X    |
| 3,801,704 | 4/1974  | Kobayashi et al. ............... 423/309      |
| 3,804,648 | 4/1974  | Birchall et al. .................... 106/56   |
| 3,892,584 | 7/1975  | Takeda et al. .................... 106/56     |

Primary Examiner—Helen M. McCarthy
Attorney, Agent, or Firm—Sughrue, Rothwell, Mion, Zinn & Macpeak

[57] ABSTRACT

A monolithic refractory material especially suitable for vibration forming comprising a refractory composition containing silica sol, alumina sol or both as a binder and a water-insoluble or slightly water-soluble phosphate. The refractory material is used for lining receptacles such as a ladle or tundish or a trough or the like for treating molten metals.

5 Claims, No Drawings

MONOLITHIC REFRACTORY MATERIALS

BACKGROUND OF THE INVENTION

1. Field of the Invention

This invention relates to monolithic refractory materials used for lining receptacles such as a ladle or tundish or a trough and the like for treating molten metals.

2. Description of the Prior Art

For lining receptacles, troughs and the like for treating molten metals, monolithic refractory materials have widely superseded conventional brick shaped refractory materials which must be in a variety of shapes and require much labor and time for lining. Lining operations for monolithic refractory materials are carried out by various techniques such as spraying, casting, stamping or vibration forming. Vibration forming is accepted as the best lining method because it easily provides the final desired shape, and the molded structure has a uniform texture without the occurrence of lamination or the like.

Monolithic refractory materials for vibration forming are required to have "thixotropy," i.e., upon the application of vibrations the refractory materials decrease in viscosity and become flowable, and upon the removal of the vibrations they are solidified and molded. Monolithic refractory materials that can be used for fibration forming are, for example, described in U.S. Pat. No. 3,892,584. The present invention is an improvement over the invention disclosed in this U.S. patent. Raw materials for the refractory materials usable in the present invention are those which do not react with silica sol or alumina sol at room temperature, for example, silica sand, fused silica, aluminum silicates such as mullite, boron carbide, and silicon nitride, silicon carbide and carbon (including graphite) which are disclosed in the specification of the above U.S. patent, hereby incorporated.

A mixture of such a refractory powder (raw material) with silica sol, alumina sol or a mixture of silica sol and alumina sol as a binder has thixotropy, and undergoes little drying shrinkage and cracking. Hence, it is suitable as a refractory material for fibration forming. Such mixtures, however, pose the following problems.

The binding force of silica sol or alumina sol or a mixture thereof appears to be due to the cohesive force of fine particles when it is dry and to sintering of the fine particles when they are at high temperature. The sintering temperature of silica sol is at least about 1,100° C, and that of alumina sol is at least about 1,200° C. The strength of such a system from the time when it becomes dry until the sintering temperature is reached is not always sufficient. Frequently, after application of a monolithic refractory lining, it undergoes damage during the steps of preheating or transferring or the like before it receives molten metal. In particular, a monolithic refractory lining is considerably consumed by mechanical and thermal shock at the time it first receives molten metal.

Furthermore, silica sol or alumina sol have only a narrow range where they are stable to changes in pH. Silica sol is stable at a pH of 2.7 to 3.1 or 9.0 to 9.8, and alumina sol is stable at a pH of 2.5 to 5.5. Outside these pH ranges, they become gelled and lose their characteristics as aqueous liquids, especially their thixotropy. In order to increase the strength from the stage when they are dry (hereafter the dry period) until the sintering temperature is reached, it may be feasible to use water-soluble salts together with the above-mentioned binder. This, however, causes changes in the pH of silica sol or alumina sol, and the characteristics of aqueous sols are lost due, for example, to gellation, which in turn leads to a failure of vibration forming.

SUMMARY OF THE INVENTION

It is one object of this invention therefore to provide a monolithic refractory material free from the above-mentioned defects.

The object of this invention can be achieved by a monolithic refractory material in accordance with this invention comprising:

1. a refractory composition containing silica sol, alumina sol or a mixture thereof as a binder; and
2. a phosphate which is insoluble or only slightly soluble in water.

DESCRIPTION OF PREFERRED EMBODIMENTS OF THE INVENTION

The refractory material of this invention has markedly increased strength when heated at a relatively low temperature from the dry period until the time of sintering, and, moreover, a greater strength than that attained with refractory materials containing conventional binders can be obtained at high temperatures. Furthermore, the characteristics of the refractory material are not at all impaired at the time of lining operations.

The phosphates insoluble or only slightly soluble in water which can be used in this invention are solid acids synthesized at a temperature of from about 230° to about 500° C, for example, a phosphate called "K-substance." K-substance can be obtained by the method disclosed, for example, in U.S. Pat. No. 3,801,704 (West German Application P. No. 2212317.17-41) and Japanese Patent Publication (OPI) No. 109298/74 which comprises heating a mixture consisting of aluminum or an aluminum-containing substance and a phosphate-containing substance and having a $P_2O_5/Al_2O_3$ mol ratio of 1 to 6 at a temperature of 90 to 450° C with stirring to form a non-transparent, semi-solid mixture, and thereafter re-heating to a temperature of 300° to 450° C to dehydrate and crystallize the system. This substance has a characteristic peak at $2\theta = 11.2°$ in its X-ray diffraction pattern and an acid strength (pKa) of 1.5, which characterizes a weakly acidic solid acid. It is characterized by having a very high acidity as compared with conventional solid acids and being insoluble or only slightly soluble in water.

That the phosphates used in this invention, such as K-substance, are insoluble or only slightly soluble in water is a very important property, and is essential to prevent pH changes of silica sol, alumina sol or a mixture thereof.

When a water soluble salt, such as sodium silicate or aluminum primary phosphate, is added as a binder for monolithic refractory materials together with water, the salt diffuses to the surface together with water at the time of drying the monolithic refractory material after its application. For this reason, a dense film is formed on the surface of the applied lining, and the subsequent diffusion and evaporation of water within the refractory material are prevented to a considerable degree, and long periods of time and strict temperature control are required for drying.

In contrast, since phosphates such as K-substance are water insoluble or only slightly water soluble solids, their use does not cause a loss of the characteristics of silica sol, alumina sol or a mixture thereof. Furthermore, even when added as a binder for monolithic refractory materials together with water, they do not form a film on the surface of the applied lining because only the water diffuses onto the surface and evaporates off at the time of drying after lining. Accordingly, the refractory material of this invention has the great advantage that it can be heated and dried at the same rate as in the case of ordinary monolithic refractory materials.

It is believed that the water insoluble or slightly water soluble phosphates used in the present invention act as a solid acid on silica sol, alumina sol or a mixture thereof. For the purposes of this invention, phosphates which do not react with silica or alumina sols, have a high acidity and many "active sites," and are very reactive in a heating process are effective as binders for refractory raw materials.

Examples of the metal moiety of such phosphates are magnesium and calcium in Group 2 of the periodic table, aluminum of Group 3, silicon, titanium and zirconium of Group 4, chromium, molybdenum and tungsten of Group 6, manganese of Group 7, and iron, cobalt and nickel of Group 8. For example, titanium phosphate as disclosed in Japanese Patent Publication (OPI) No. 34499/74 can be used for this purpose. Mixtures or complexes of phosphates of two or more of such metals can also be used in the present invention. The term "slightly water soluble" as is used herein means a solubility in water of less than 2 by weight %.

One embodiment of the present invention will be described below by specific working examples.

The refractory powdery composition (raw material) is properly selected according to the size of the receptacle or trough to be lined with the refractory material, the thickness of the lining, the type of molten metal to be contained, the temperature, and the time, and its particle diameter is adjusted before use all in a conventional manner.

Various silica sols and alumina sols are available according to their solids content. In order to render the refractory powdery composition thixotropic and thus moldable by vibration forming and to impart the required strength thereto, the use of sols having a solids content of more than about 5% is desirable. The amount of the binder sol to be added to the refractory powdery composition differs somewhat according to the quality and particle diameter of the refractory powdery composition, but is generally from about 5 to about 20 parts by weight per 100 parts by weight of the refractory powdery composition. If the amount of the binder is less than about 5 parts by weight, the refractory powdery composition does not become thixotropic even when it is vibrated, and, therefore, cannot be molded sufficiently. On the other hand, when the amount is above about 20 parts by weight, the mixture becomes too soft and weak, and its shape retention after vibration forming is poor, and extremely extended periods of time are required for drying.

Preferably, the water insoluble or slightly water soluble phosphate is finely pulverized prior to use so that at least about 80% of the entire particles pass through a 200 mesh (74 μ) sieve. A preferred amount of the phosphate is about 0.3 to about 3.0 parts by weight per 100 parts by weight of the refractory powdery composition. If the amount is less than about 0.3 part by weight, no appreciable effect is obtained, while if it is added in an amount exceeding about 3.0 parts by weight, no appreciable increase in effects can be seen.

Specific examples of formulations of the refractory materials of the present invention and comparative refractory materials are shown in Table 1 below. In Table 1, the proportions of the raw materials for the refractory powdery composition are expressed as parts by weight, and the proportions of the binder, the phosphate and water are expressed on the same basis per 100 parts by weight of the refractory powdery composition.

TABLE 1

| Samples | A | B | A'&B' | C | C' | D | D' | E | E' |
|---|---|---|---|---|---|---|---|---|---|
| Sintered alumina (through a 4 mesh sieve) | | | | 60 | 60 | | | | |
| Calcined alumina (through a 200 mesh sieve) | 8 | 8 | 8 | | | | | | |
| Mullite (through a 4 mesh sieve) | 62 | 62 | 62 | | | | | | |
| Mullite (through a 100 mesh sieve) | 30 | 30 | 30 | 15 | 15 | 20 | 20 | | |
| Clay chamotte (through a 10 mesh sieve) | | | | | | 57 | 57 | | |
| Fused silica (through a 20 mesh sieve) | | | | | | | | 30 | 30 |
| Natural silicon sand (through a 6 mesh sieve) | | | | | | | | 70 | 70 |
| Silicon carbide (through a 100 mesh sieve) | | | | 15 | 15 | 20 | 20 | | |
| Bentonite | | | | | 3 | | 3 | | |
| Silica sol (solids content, 20%) | 1.0 | 1.0 | 1.0 | | 6 | | 6 | 5.5 | 5.5 |
| Alumina sol (solids content, 10%) | 6.5 | 6.5 | 6.5 | 8.0 | 8.0 | | | | |
| Aluminum phosphate (K-substance) | 1.0 | | | 2.0 | | 1 | | 2 | |
| Titanium phosphate | | 1.0 | | | | | | | |
| Water | | | | | 1 | | 1 | | 1 |

Samples A, B, C, D and E are samples of the present invention, whereas Samples A', B', C', D' and E' are samples for comparison corresponding to the samples of the invention.

The ingredients of the refractory powdery composition were well mixed, and then the sol binder and the water insoluble or slightly water soluble phosphate with or without water were added to the mixture. The resulting mixture was placed in a cyclindrical mold having an inner diameter of 50 mm, and a top former which was easily insertable in the cylindrical mold was placed on the top surface of the mixture. The entire former system was placed on a vibratory stand, and vibrations imparted thereto with an amplitude of 1 mm at a speed of 3,600 rpm and an acceleration of 7.4 G for 10 minutes to mold the mixture. The molded product was removed from the mold and aged at room temperature for one day. It was then dried in a dryer at 110° ± 5° C, and fired at 500°, 800°, 1,200°, or 1,450° C, respectively. The physical properties of the resulting fired products were measured. The firing temperatures of 500° and 800° C used are temperatures readily attained by an operation such as pre-heating in actually applying the monolithic refractory material to, for example, a receptacle for treating molten metal. The firing temperatures of 1,200° and 1,450° C are above the sintering temperature of the sol and presumably the temperatures which the refractory material will attain when it receives molten metal. The results are shown in Table 2.

lining or at the time they first receive molten metal is prevented. Furthermore, their strength at temperatures at which molten metal is treated is increased. Accordingly, the refractory materials of this invention have a

TABLE 2

| Properties | Samples |  |  |  |  |  |  |  |  |
|---|---|---|---|---|---|---|---|---|---|
|  | A | B | A'&B' | C | C' | D | D' | E | E' |
| Percentage of linear shrinkage(%) |  |  |  |  |  |  |  |  |  |
| 110° C after drying | <−0.1 | <−0.1 | <−0.1 | <−0.1 | <−0.1 | −0.2 | −0.2 | <−0.1 | <−0.1 |
| 500° C after firing | <−0.1 | −0.1 | −0.2 | −0.2 | −0.2 | −0.3 | −0.3 | +0.4 | +0.4 |
| 800° C after firing | −0.1 | −0.1 | <+0.1 | −0.1 | −0.1 | −0.3 | −0.3 | +0.5 | +0.5 |
| 1,200° C after firing | −0.1 | −0.1 | −0.1 | −0.1 | −0.1 | −0.4 | −0.4 | +0.7 | +0.8 |
| 1,450° C after firing | <+0.1 | +0.2 | +0.1 | <+0.1 | <+0.1 | −0.7 | −0.6 | +1.2 | +1.8 |
| Apparent porosity (%) |  |  |  |  |  |  |  |  |  |
| 500° C after firing | 18.1 | 18.2 | 18.9 | 17.9 | 19.2 | 19.3 | 19.5 | 20.4 | 20.6 |
| 800° C after firing | 20.2 | 20.4 | 20.8 | 20.0 | 20.1 | 21.3 | 21.6 | 22.5 | 22.8 |
| 1,200° C after firing | 20.8 | 20.9 | 21.2 | 20.4 | 20.6 | 20.9 | 21.1 | 23.2 | 24.8 |
| 1,450° C after firing | 20.7 | 21.1 | 21.8 | 20.4 | 20.4 | 18.9 | 19.4 | 25.9 | 28.3 |
| Compressive strength (kg/cm$^2$) |  |  |  |  |  |  |  |  |  |
| 110° C after drying | 74 | 72 | 78 | 86 | 88 | 72 | 78 | 61 | 71 |
| 500° C after firing | 138 | 131 | 84 | 146 | 92 | 125 | 81 | 114 | 88 |
| 800° C after firing | 211 | 207 | 131 | 269 | 143 | 198 | 118 | 131 | 91 |
| 1,200° C after firing | 423 | 408 | 241 | 577 | 253 | 693 | 127 | 141 | 97 |
| 1,450° C after firing | 818 | 743 | 378 | 1065 | 396 | 781 | 477 | 205 | 116 |

It can be seen from Table 2 that the refractory materials containing the water insoluble or slightly water soluble phosphate have outstanding strength when fired at 500° and 800° C and also increased strength when fired at 1,200° and 1,450°C, as compared with the refractory materials containing only silica sol, alumina sol or a mixture thereof as a binder. The reason for this has not yet been verified. However, the outstanding strength attained as a result of firing at 500° and 800° C is presumably because the water insoluble or slightly water soluble phosphates, namely aluminum phosphate and titanium phosphate used in the above-mentioned examples, are synthesized at a temperature below 500° C, and therefore react upon heating at a higher temperature. The increased strength as a result of firing at 1,200° and 1,450° C is presumably due to a synergistic effect obtained by the reaction of the sol with the phosphate.

The mixtures of the refractory powdery compositions with the sols and phosphates as shown in Table 1 were stored at room temperature in a sealed condition so as to prevent evaporation, and, after a lapse of 10 days, 20 days, and 30 days, respectively, molded by the molding method described above. The bulk densitites of the molded products were measured, and the results are shown in Table 3.

TABLE 3

| Bulk density (g/cc) of the molded products | Sample A | Sample A' (comparison) |
|---|---|---|
| Immediately after mixing | 2.41 | 2.42 |
| After 10 days | 2.42 | 2.41 |
| After 20 days | 2.41 | 2.40 |
| After 30 days | 2.41 | 2.38 |

As can be seen from Table 3, the refractory material of this invention, as compared to the comparison sample, did not show a change in bulk density after molding even after it had been stored for 30 days. This means that its vibration formability, that is, its formability ascribable to thixotropy, was not at all reduced.

It is also possible to store the refractory powdery composition and the aqueous sol separately, and mix then at the site of lining.

According to the present invention, monolithic refractory materials containing silica sol, alumina sol or a mixture thereof as a binder are improved so as to have high strength up to the sintering temperature of the sol without changing the formability ascribable to the sol, and mechanical wear at the time of pre-heating after lining or at the time they first receive molten metal is prevented. Furthermore, their strength at temperatures at which molten metal is treated is increased. Accordingly, the refractory materials of this invention have a long life, are durable and have superior properties as monolithic refractory materials for vibration forming.

While the invention has been described in detail and with reference to specific embodiments thereof, it will be apparent to one skilled in the art that various changes and modifications can be made therein without departing from the spirit and scope thereof.

What is claimed is:

1. In a monolithic refractory material comprising
   a. a refractory composition consisting of a powdery refractory component which does not react with silica sol or alumina sol at room temperature; and
   b. a binder having a solids content of more than about 5% by weight selected from the group consisting of silica sol, alumina sol or a mixture thereof; the improvement which comprises said material being a thixotropic monolithic refractory material for vibration forming which consists essentially of
      i. 100 parts by weight of said powdery refractory component;
      ii. from about 5 to 20 parts by weight of said binder; and
      iii. from about 0.3 to 3.0 parts by weight of a water-insoluble or slightly water-soluble metal phosphate synthesized at a temperature of from about 230° to about 500° C.

2. The refractory material of claim 1, wherein said water-insoluble or slightly water-soluble phosphate is a phosphate of a metal selected from the group consisting of magnesium, calcium, aluminium, silicon, titanium, zirconium, chromium, molybdenum, tungsten, manganese, iron, cobalt and nickel, a mixture thereof or a complex of at least two of said metal phosphates.

3. The refractory material of claim 1, wherein said water-insoluble or slightly water-soluble phosphate is aluminum phosphate or titanium phosphate.

4. The refractor material of claim 1, wherein said powdery, refractory component is selected from the group consisting of silica sand, fused silica, aluminum silicates, boron carbide, silicon nitride, silicon carbide and carbon.

5. The refractory material of claim 1, wherein the water insoluble or slightly water soluble phosphate is a finely divided material at least about 80% of which consists of particles passing through a 200 mesh sieve.

* * * * *